United States Patent [19]
Yoshida

[11] Patent Number: 5,953,377
[45] Date of Patent: Sep. 14, 1999

[54] CODED MODULATION USING REPETITION AND TREE CODES

[75] Inventor: Makoto Yoshida, Kawasaki, Japan

[73] Assignee: Fujitsu Limited, Kanagawa, Japan

[21] Appl. No.: 08/828,420

[22] Filed: Mar. 28, 1997

[30] Foreign Application Priority Data

Aug. 29, 1996 [JP] Japan ..................................... 8-228802

[51] Int. Cl.$^6$ ............................. H04L 27/04; H04L 27/36
[52] U.S. Cl. ............................................ 375/295; 375/298
[58] Field of Search ..................................... 375/261, 264, 375/286, 298, 295, 303, 308, 265; 714/786

[56] References Cited

U.S. PATENT DOCUMENTS

| | | | |
|---|---|---|---|
| 5,150,381 | 9/1992 | Forney, Jr. et al. | 375/298 |
| 5,289,501 | 2/1994 | Seshadri et al. | 375/286 |
| 5,544,328 | 8/1996 | Seshadri | 375/261 |

*Primary Examiner*—Temesghen Ghebretinsae
*Attorney, Agent, or Firm*—Helfgott & Karas, PC

[57] ABSTRACT

A transmitter includes a repetition encoder generating a repetition code sequence having a word length of r bits by carrying out a repetition coding with respect to 1 bit of a transmission unit which divides transmission information by a predetermined word length, where a rate of the repetition coding is set equal to a reciprocal of a predetermined integer r, a tree encoder generating a tree code sequence by carrying out a tree coding with respect to the other bits of the transmission unit, where a rate of the tree coding is set to k/n, k denotes an information block length and n denotes a code block length, a mapping part carrying out a mapping with respect to a combination of the repetition code sequence generated by the repetition encoder and the tree code sequence generated by the tree encoder, based on a set partitioning while maintaining correspondence between the mapping and the transmission unit, and a modulator generating a transmitting wave signal by carrying out an M-ary modulation scheme with respect to a carrier wave signal based on the combination which is mapped by the mapping part, and transmitting the transmitting wave signal to a radio channel. The predetermined word length is (1+rk/N) bits, and N denotes a number of transmission symbols indicated by a single branch of a trellis diagram indicating a sequence of the tree code sequence. The modulator modulates the carrier wave signal by $2^{(1+n/N)}$ levels.

7 Claims, 13 Drawing Sheets

CODED MODULATION USING REPETITION AND TREE CODES

BACKGROUND OF THE INVENTION

The present invention generally relates to transmitters and receivers, and more particularly to a transmitter which employs a coded modulation technique and to a receiver adapted to receive information from such a transmitter.

In digital radio communication systems, an M-ary modulation scheme is in many cases applied to a radio transmission channel. Particularly in the case of a mobile communication system, proposals have been made to apply a coded modulation technique employing the M-ary modulation scheme in order to simultaneously realize reduction in the power consumed at a mobile station and effective utilization of finite radio frequencies.

FIG. 1 is a system block diagram showing an example of a transmitter employing the coded modulation technique which is called trellis coded modulation (TCM) or block coded modulation (BCM) scheme. In FIG. 1, transmission information is divided into n-bit blocks. 1 bit of each n-bit block is input to an M-ary modulator 165, while the remaining n-1 bits are input to the M-ary modulator 165 via an encoder 166. A transmitting wave signal is obtained from an output of the M-ary modulator 165, and this transmitting wave signal is supplied to a transmitting part which is not shown.

In the transmitter having the construction shown in FIG. 1, the encoder 166 generates a code sequence by subjecting the n-1 bits of each n-bit block to a trellis coding (or block coding) at a rate R of (n-1)/n. The M-ary modulator 165 employing (n+1)-bit level reads the n-bit code sequence and the 1 bit which is not encoded, and generates the transmitting wave signal by subjecting a carrier wave signal to a (n+1)-level modulation based on the two.

For simplicity, if it is assumed that an 8-phase phase shift keying is employed, signal points of the transmitting wave signal which is generated in the above described manner become as shown in FIG. 2 by the M-ary modulator 165 by mapping symbols $a_1$, $a_2$ and $a_3$ (n=2 in this case) based on the set partitioning. Accordingly, the symbols $a_1$, $a_2$ and $a_3$ and the signal points are set to values which satisfy a corresponding relationship $C_1\Delta_1 = C_2\Delta_2 = C_3\Delta_3$ when a uniform error protection is possible, where $C_1$, $C_2$ and $C_3$ denote minimum distances of the codes for each bit level, respectively, and $\Delta_1$, $\Delta_2$ and $\Delta_3$ denote minimum distances between the signal points in the signal space. In this case, assuming a non-coded bit is $a_1$, $C_1\Delta_1 = C_2\Delta_2$ is required ebcause of $C_2 = C_3$.

Furthermore, at a receiving end which receives and demodulates the transmitting wave signal described above, the structure of the trellis diagram becomes simple because the received signal to be demodulated is given by a single coding level, and a maximum likelihood decoding based on Viterbi decoding can be carried out efficiently.

FIG. 3 is a system block diagram showing another example of a transmitter employing the coded modulation, which is called a multi-level coded modulation (MLCM) scheme. In FIG. 3, the transmission information is input to a serial-to-parallel converter 170, and M outputs of the serial-to-parallel converter 170 are input to a mapping part 172 via corresponding encoders $171_1$ through $171_M$. An output of the mapping part 172 is input to a modulator 173, and the transmitting wave signal is obtained from an output of the modulator 173.

In the transmitter having the construction shown in FIG. 3, the serial-to-parallel converter 170 divides the transmission information into units of M bits and carries out a serial-to-parallel conversion. The encoders $171_1$ through $171_M$ independently encode the M groups which are obtained in parallel from the serial-to-parallel converter 170 at a desired coding level. The mapping part 172 and the modulator 173 modulate a carrier wave signal depending on each of the block codes which are generated by the encoding, so as to generate the transmitting wave signal.

The corresponding relationship of the signal points of the generated transmitting wave signal and the symbols corresponding to the signal points is similar to that of the example shown in FIG. 1, and a description thereof will be omitted.

According to the transmitter shown in FIG. 3, the encodings at the individual bit levels are carried out in parallel, and the rate of the encoding can positively be set to a desired value. For this reason, it is possible to secure the minimum value of the distance between the signal points of each individual group (bit level) to a higher value as compared to the example shown in FIG. 1.

The asynchronous transfer mode (ATM) is a transmission system for realizing mainly a broadband integrated services digital network (B-ISDN), and the precondition is to make the transmission by wire, particularly by optic fiber. Hence, it is a precondition that the bit error rate (BER) in a satisfactory state is $10^{-11}$ or less.

In general, the required BER of the header is $10^{-7}$ to $10^{-11}$ or less since the cell loss rate affects the system performance, and the required BER of the data is $10^{-6}$ or less for images or the like.

On the other hand, the BER performance of the radio communication is poor, and the radio communication is mainly used for voice transmission with a required BER of $10^{-2}$ or greater and for low-speed data on the order of several kbps. Furthermore, in the mobile communication systems, the BER performance is floored due to multipath fading.

In such a small channel capacity, it is not effective, both frequency-wise and power-wise, to make the overall BER performance to a very small value less than or equal to $10^{-11}$, for example. For this reason, in order to realize the ATM in the radio communication, it is necessary to prepare 2 different channels for the header and the data, respectively, so that the required BER for the header is $10^{-7}$ to $10^{-11}$ or less and the required BER for the data is $10^{-6}$ or less. The BER performance for the header is set very small because control information such as destination information is included in the header, and the cell cannot be received if the contents or sequence of the headers are damaged or changed due to the error. The cell which cannot be received must be discarded, and then the system performance is heavily degraded.

On the other hand, in order to make a high-speed data transmission in a channel having a poor BER performance, it is essential to employ an error correction technique including coded modulation schemes, and such an error correction technique has come into practical use in satellite communications and some mobile communications. In addition, as techniques for compensating for the fading, it is known that a diversity technique, an adaptive antenna technique using directional antenna, and equalization are effective in eliminating the BER floor.

However, with respect to the conventional trellis coded modulation, block coded modulation, and multi-level coded modulation using the non-coded bit level, a large number of bit errors are generated for the non-coded bit level due to the fluctuation of the transmission characteristic of the radio transmission channel, such as fading, and the overall transmission performance gets a few gain.

On the other hand, according to the multi-level coded modulation not using the non-coded bit level, or using more than one coding level, the trellis structure becomes more complicated as the number of coding levels increases and for this reason, a multi-stage decoding is carried out at the receiving end. In other words, decoders $D_1$ through $D_M$ sequentially carry out the decoding process under timings determined by the multiple stages of delays provided by delay elements $T_1$ through $T_M$, and results of the decoded process are subjected to a parallel-to-serial conversion in a parallel-to-serial converter PSC as shown in FIG. 4. According to this multi-stage decoding, a decoding delay equal to a sum of the delays provided by the delay elements $T_1$ through $T_M$ occurs, thereby degrading the real-time transmission performance. Furthermore, since the coding level in the higher layer cannot use the decoded result of the coding level in the lower layer, a maximum likelihood decoding cannot be achieved and the performance is degraded.

In addition, in the ATM network by use of the cells, the transmission must wait until a predetermined amount of information is filled in the cells. Hence, in such an ATM network, a transmission delay occurs when transmitting low-speed data such as voice data because it takes time for the information to be filled in the cells. On the other hand, when transmitting high-speed data such as image data, a transmission delay similarly occurs in the process of carrying out error correction and re-transmission (ARQ: automatic repeat request) in order to meet a required BER.

Furthermore, in order to efficiently realize the radio communication employing the ATM, it is conceivable to prepare 2 different communication systems with different BERs, that is, one for the header with a BER of $10^{-7}$ to $10^{-11}$ or less and another for the data with a BER of $10^{-6}$ or less. However, the efficiency becomes poor if 2 physically different channels are prepared, individually.

SUMMARY OF THE INVENTION

Accordingly, it is a general object of the present invention to provide a novel and useful transmitter and receiver in which the problems described above are eliminated.

Another and more specific object of the present invention is to provide a transmitter and a receiver which can simplify the encoding process and the decoding process, and can maintain a high BER and a high frequency utilization efficiency particularly under fading environments. In other words, the goal of the present invention is to optimize the BER performance over a fading channel, with a high efficiency and reasonable delay.

Still another object of the present invention is to provide a transmitter comprising a repetition encoder generating a repetition code sequence having a word length of r bits by carrying out a repetition coding with respect to 1 bit of a transmission unit which divides transmission information by a predetermined word length, where a rate of the repetition coding is set equal to a reciprocal of a predetermined integer r, a tree encoder generating a tree code sequence by carrying out a tree coding with respect to the other bits of the transmission unit, where a rate of the tree coding is set to k/n, k denotes an information block length and n denotes a code block length, a mapping part carrying out a mapping with respect to a combination of the repetition code sequence generated by the repetition encoder and the tree code sequence generated by the tree encoder, based on a set partitioning while maintaining correspondence between the mapping and the transmission unit, and a modulator generating a transmitting wave signal by carrying out an M-ary modulation scheme with respect to a carrier wave signal based on the combination which is mapped by the mapping part, and transmitting the transmitting wave signal to a radio channel, where the predetermined word length is (1+rk/N) bits, N denotes a number of transmission symbols indicated by a single branch of a trellis diagram indicating a sequence of the tree code sequence, and the modulator modulates the carrier wave signal by $2^{(1+n/N)}$ levels. According to the transmitter of the present invention, compared to the conventional trellis coded modulation, the block coded modulation and the multi-level coded modulation using the non-coded bit level, the BER performance over the fading channel is greatly improved at the receiving end. Further, compared to the conventional multi-level coded modulation, the decoding delay is compressed, and a maximum likelihood decoding can be carried out efficiently based on a simple processing procedure.

A further object of the present invention is to provide the transmitter described above, wherein the transmission unit is given by a format which is made up of a combination of 1 bit corresponding to an order of tolerable upper limit values of a required BER for the repetition code and the other bits, and the transmitter further comprises a divider dividing the transmission unit into the 1 bit and the other bits based on the format, and supplying the 1 bit to the repetition encoder the other bits to the tree encoder. According to the transmitter of the present invention, each of the bits forming the transmission unit are subjected to the repetition coding or the tree coding respectively corresponding to a desired coding level. Hence, as long as the combination of the number of these bits and the coding levels match, the bit error can be reduced and the maximum likelihood decoding can be carried out efficiently based on a simple processing procedure at the receiving end.

Another object of the present invention is to provide a transmitter comprising a divider reading transmission units which are given by a format in which transmission information is divided by a word having a bit length A+B which is equal to a sum of A bits corresponding to an order of tolerable upper limit values of a BER and B bits, and generating a first bit sequence and a second bit sequence by isolating the A bits and the B bits from the transmission unit based on the format and adding first dummy bits and second dummy bits to the A bits and the B bits, respectively, a repetition encoder generating a repetition code sequence by extracting 1 bit at a time from the first bit sequence generated by the divider and carrying out a repetition coding at a rate equal to a reciprocal of a predetermined integer r, a tree encoder generating a tree code sequence by extracting a predetermined number of bits at a time from the second bit sequence generated by the divider and carrying out a tree coding at a rate k/n, where k denotes an information block length and n denotes a code block length, a mapping part carrying out a mapping with respect to a combination of the repetition code sequence generated by the repetition encoder and the tree code sequence generated by the tree encoder, based on a set partitioning while maintaining correspondence between the mapping and the transmission unit, and a modulator generating a transmitting wave signal by carrying out an M-ary modulation scheme with respect to a carrier wave signal based on the combination which is mapped by the mapping part, and transmitting the transmitting wave signal to a radio channel, wherein, with respect to a number N of transmission symbols indicated by a single branch of a trellis diagram indicating a sequence of the tree code sequence, a number of the first dummy bits for the first bit sequence is {max(A,[BN/rk])−A} and a number of the dummy second bits for the second bit sequence is {max(A, [BN/rk])−BN/rk}·rk/N, the predetermined number is rk/N, and the modulator modulates the carrier wave signal by $2^{(1+n/N)}$ levels. According to the transmitter of the present invention, the word length of the transmission unit is corrected to a value adapted to each desired coding level, and the coded modulation is applied with the combination of the repetition coding and the tree coding. For this reason, the transmission information having various formats can be transmitted by carrying out the coded modulation, and at the receiving end, it is possible to reduce the bit error and to efficiently carry out the maximum likelihood decoding based on a simple processing procedure.

Still another object of the present invention is to provide a receiver comprising a demodulator obtaining a reception sequence by demodulating a reception wave received from a transmitting end via a radio channel, a decoder generating a decoded symbol sequence by carrying out a maximum likelihood decoding with respect to the reception sequence obtained by the demodulator, and a demapping part reading the decoded symbol sequence generated by the decoder, and restoring a transmission unit of the reception wave by carrying out a demapping adapted to a format of a set partitioning carried out by a mapping at the transmitting end which transmits the reception wave based on transmission information. According to the receiver of the present invention, it is possible to positively restore the transmission information (transmission unit) indicated by the reception wave which is received from the transmitter via the radio channel.

A further object of the present invention is to provide a receiver comprising a demodulator obtaining a reception sequence by demodulating a reception wave received from a transmitting end via a radio channel, a decoder generating a decoded symbol sequence by carrying out a maximum likelihood decoding with respect to the reception sequence obtained by the demodulator, a demapping part reading the decoded symbol sequence generated by the decoder, and restoring a first bit sequence and a second bit sequence which are generated by a demapping which is adapted to a format of a set partitioning carried out by a mapping carried out at the transmitting end which transmits the reception wave based on transmission information, and a word length corrector reading the first bit sequence and the second bit sequence which are obtained by the demapping part, and restoring a transmission unit by eliminating dummy bits which are added to the first bit sequence and the second bit sequence by the set partitioning carried out at the transmitting end. According to the receiver of the present invention, it is possible to positively restore the transmission information (transmission unit) indicated by the reception wave which is received from the transmitter via the radio channel.

Other objects and further features of the present invention will be apparent from the following detailed description when read in conjunction with the accompanying drawings.

DESCRIPTION OF THE PREFERRED EMBODIMENTS

First, a description will be given of the operating principle of a transmitter according to a first aspect of the present invention, by referring to FIG. 5.

Figure 1:
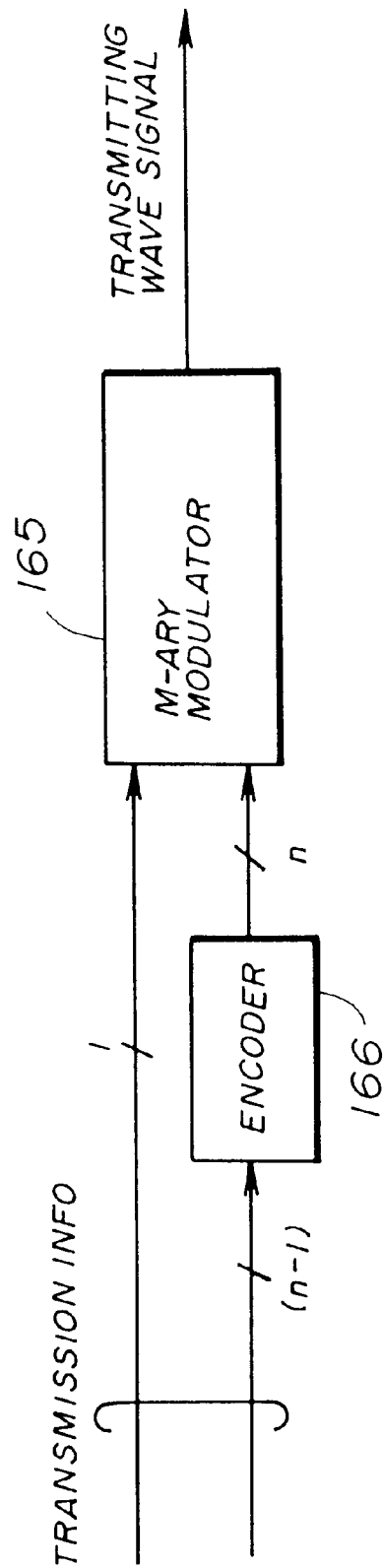
FIG. 1 is a system block diagram showing an example of a transmitter employing the coded modulation technique.
Figure 2:
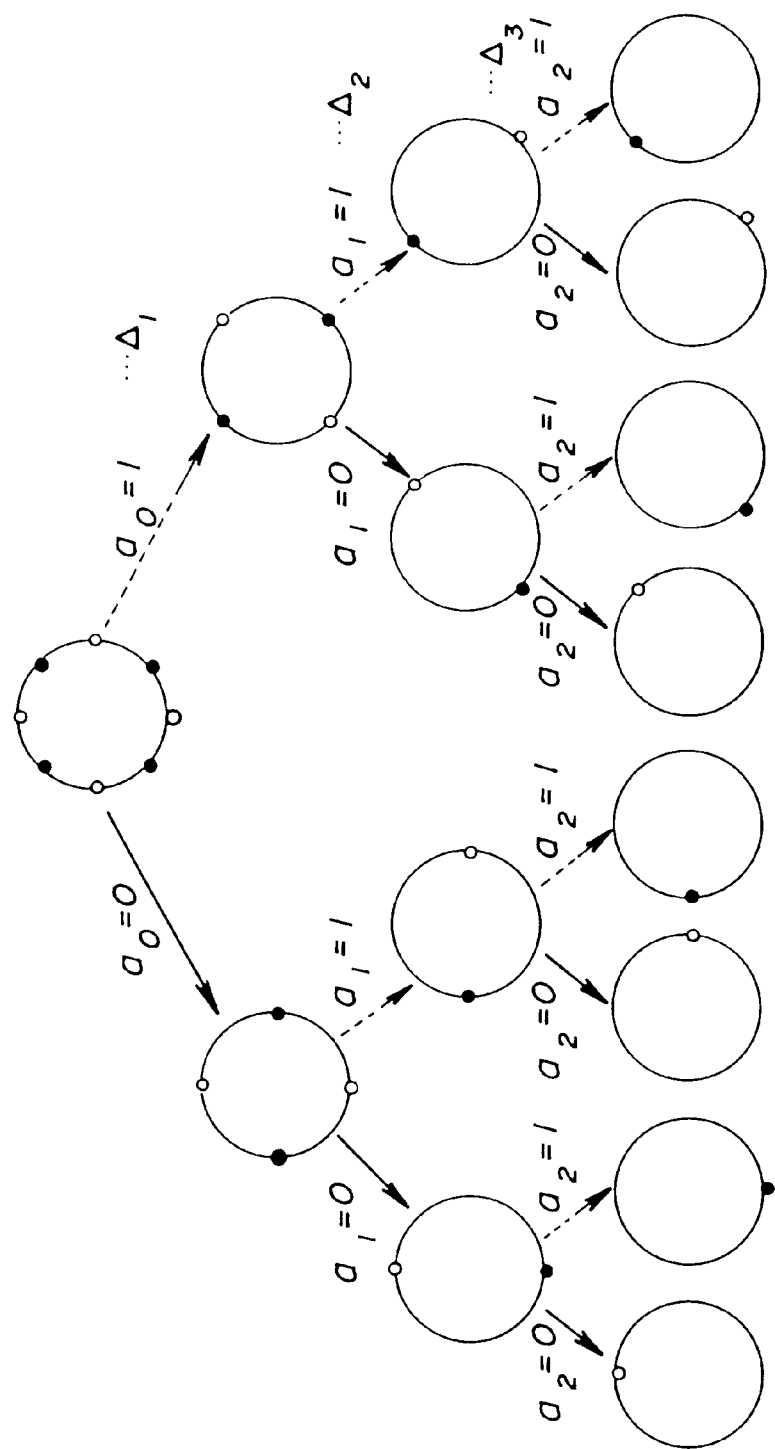
FIG. 2 is a diagram for explaining distribution of signal points based on the set partitioning.
Figure 3:
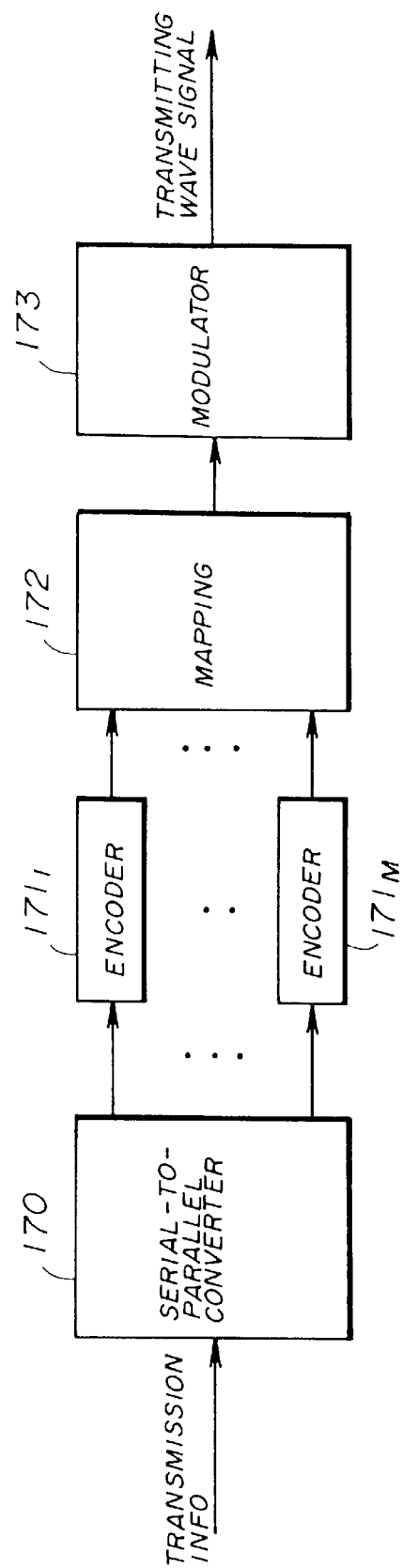
FIG. 3 is a system block diagram showing another example of the transmitter employing the coded modulation.
Figure 4:
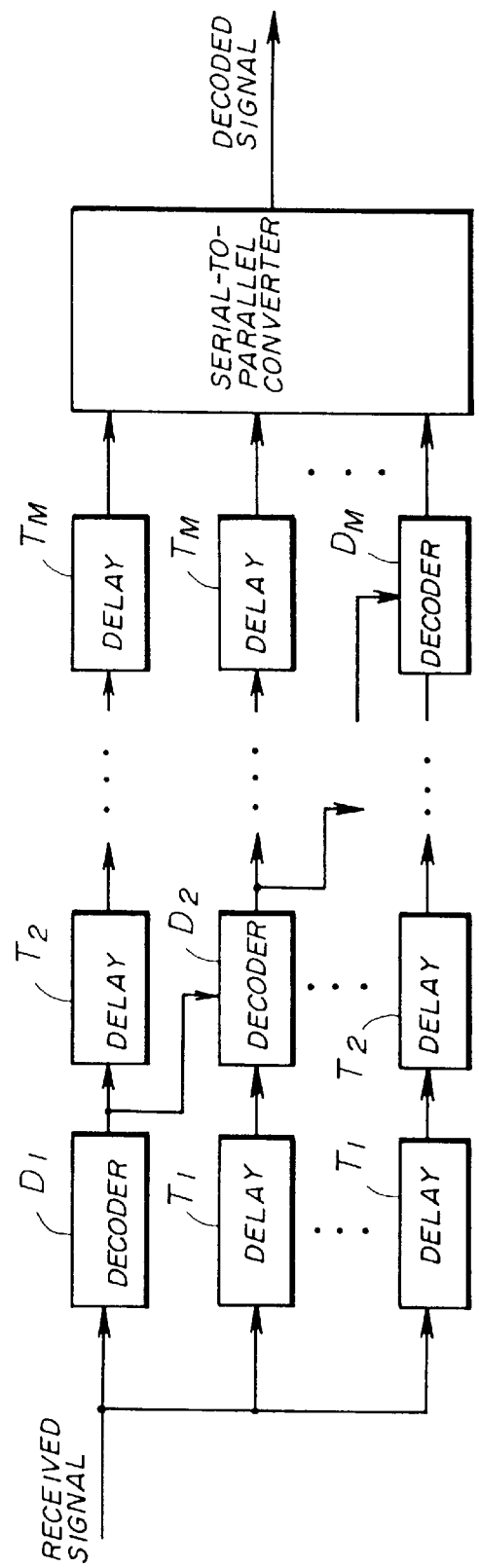
FIG. 4 is a diagram for explaining a processing delay generated in the example of the transmitter employing the multi-level coded modulation not using the non-coded bit level.
Figure 5:
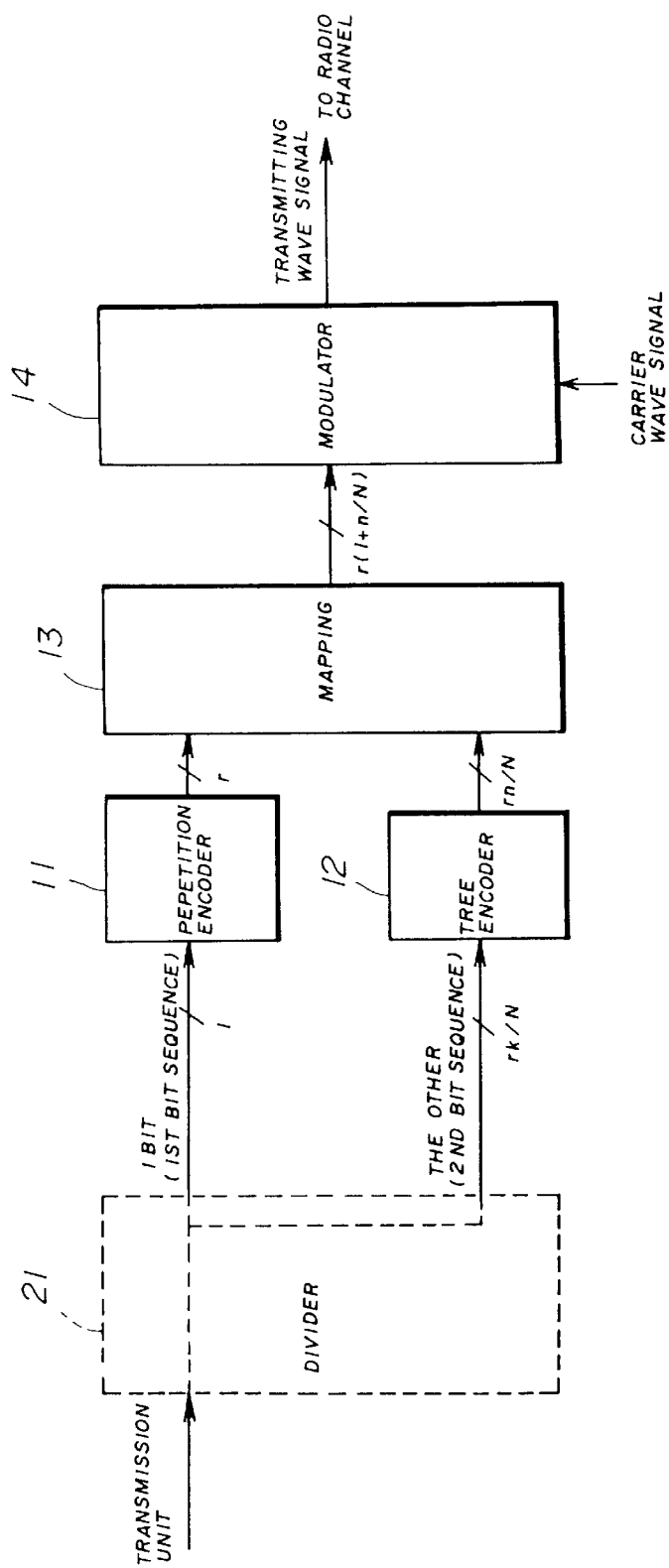
FIG. 5 is a system block diagram for explaining the operating principle of a transmitter according to a first aspect of the present invention.

A transmitter includes a repetition encoder 11, a tree encoder 12, a mapping part 13 and a modulator 14 which are connected as shown in FIG. 5. The repetition encoder 11 generates a repetition code sequence having a word length of r bits by carrying out a repetition coding with respect to 1 bit of a transmission unit which is obtained by dividing transmission information by a predetermined word length, and a rate of the repetition coding is set equal to a reciprocal of a predetermined integer r. On the other hand, the tree encoder 12 generates a tree code sequence by carrying out a tree coding with respect to the other bits of the transmission unit, and a rate of the tree coding is set to k/n, where k denotes an information block length and n denotes a code block length.

The mapping part 13 carries out a mapping with respect to a combination of the repetition code sequence generated by the repetition encoder 11 and the tree code sequence generated by the tree encoder 12, based on the set partitioning while maintaining correspondence between the mapping and the transmission unit. The modulator 14 generates a transmitting wave signal by carrying out an M-ary modulation scheme with respect to a carrier wave signal based on the combination which is mapped by the mapping part 13, and transmits the transmitting wave signal to a radio channel.

The predetermined word length is (1+rk/N) bits, where N denotes a number of transmission symbols indicated by a single branch of a trellis diagram indicating a sequence of the tree code sequence. In addition, the modulator 14 modulates the carrier wave signal by $2^{(1+n/N)}$ levels.

According to this transmitter shown in FIG. 5, all bits forming the transmission information are encoded and are subjected to coded modulation and transmitted. In addition, the trellis diagram indicating the code sequence given by the above described mapping is given as a combination of 2 identical sub-trellis diagrams corresponding to the individual logic values assumed by the repetition code sequence.

Therefore, compared to the conventional trellis coded modulation, the block coded modulation and the multi-level coded modulation using the non-coded bit level, the BER performance over the fading channel is greatly improved at the receiving end. Further, compared to the conventional multi-level coded modulation employing more than one coding level, the decoding delay is compressed, and a maximum likelihood decoding can be carried out efficiently based on a simple processing procedure.

The transmission unit may be given by a format which is made up of a combination of 1 bit, and the other bits corresponding to the order of tolerable upper limit values of the required BER for the repetition code. In this case, a divider 21 indicated by a phantom line in FIG. 5 is provided to divide the transmission unit into the 1 bit and the other bits based on the format. The divider 21 supplies the 1 bit to the repetition encoder 11 and supplies the other bits to the tree encoder 12.

In this case, each of the bits forming the transmission unit are subjected to the repetition coding or the tree coding respectively corresponding to a desired coding level. Hence, as long as the combination of the number of these bits and the coding levels match, the bit error can be reduced and the maximum likelihood decoding can be carried out efficiently based on a simple processing procedure at the receiving end.

Next, a description will be given of the operating principle of a receiver according to the first aspect of the present invention, by referring to FIG. 6.

Figure 6:
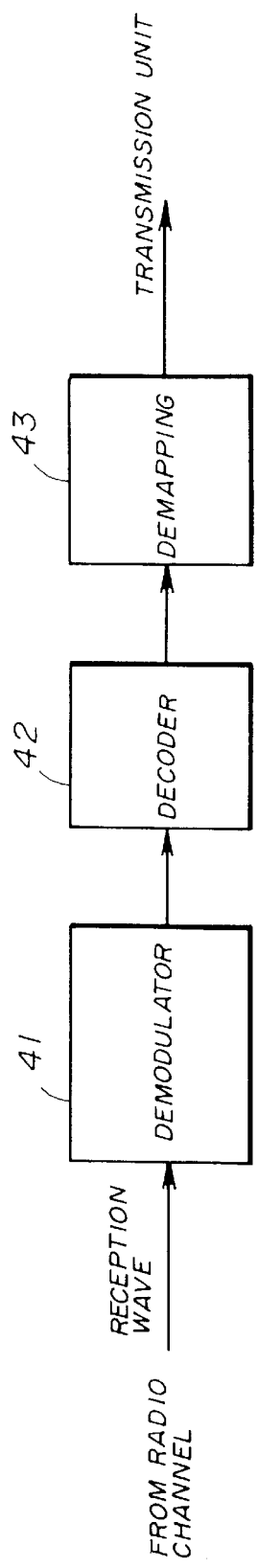
FIG. 6 is a system block diagram for explaining the operating principle of a receiver according to the first aspect of the present invention.

A receiver includes a demodulator 41, a decoder 42 and a demapping part 43 which are connected as shown in FIG. 6. The demodulator 41 obtains a reception sequence by demodulating a reception wave received from the transmitter shown in FIG. 5 via the radio channel. The decoder 42 generates a decoded symbol sequence by carrying out a maximum likelihood decoding with respect to the reception sequence obtained by the demodulator 41. The demapping part 43 reads the decoded symbol sequence generated by the decoder 42, and restores the transmission unit by carrying out a demapping adapted to the format of the set partitioning carried out by the mapping part 13 of the transmitter shown in FIG. 5.

According to this receiver shown in FIG. 6, it is possible to positively restore the transmission information (transmission unit) indicated by the reception wave which is received from the transmitter via the radio channel.

Next, a description will be given of the operating principle of a transmitter according to a second aspect of the present invention, by referring to FIG. 7.

Figure 7:
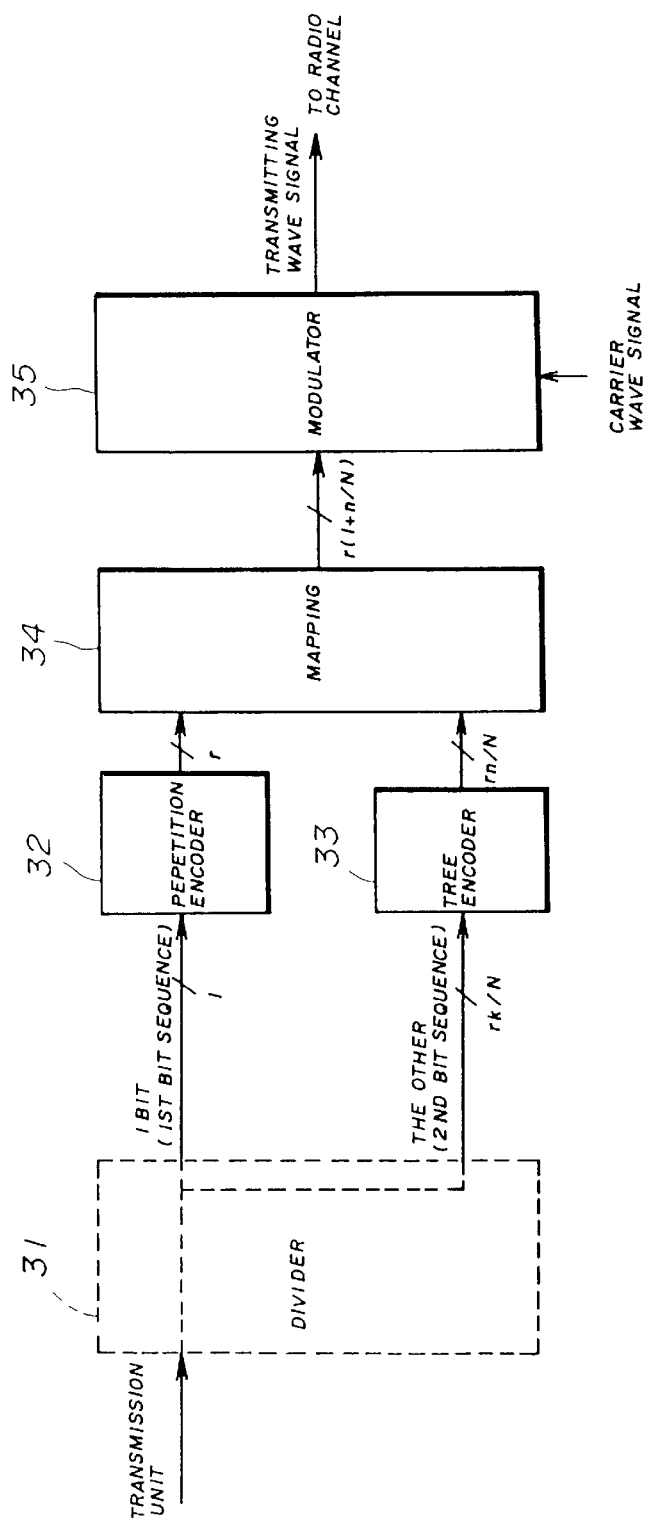
FIG. 7 is a system block diagram for explaining the operating principle of a transmitter according to a second aspect of the present invention.

A transmitter includes a divider 31, a repetition encoder 32, a tree encoder 33, a mapping part 34 and a modulator 35 which are connected as shown in FIG. 7. The divider 31 reads transmission units which are given by a format in which transmission information is divided by a word having a bit length A+B which is equal to a sum of A bits corresponding to the order of tolerable upper limit values of the required BER and B bits, and generates a first bit sequence and a second bit sequence by isolating the A bits and the B bits from the transmission unit based on the format and adding first dummy bits for the first bit sequence and second dummy bits for the second bit sequence to the A bits and the B bits, respectively.

The repetition encoder 32 generates a repetition code sequence by extracting 1 bit at a time from the first bit sequence generated by the divider 31 and carrying out a repetition coding at a rate equal to a reciprocal of a predetermined integer r. On the other hand, the tree encoder 33 generates a tree code sequence by extracting a predetermined number of bits at a time from the second bit sequence generated by the divider 31 and carrying out a tree coding at a rate k/n, where k denotes an information block length and n denotes a code block length.

The mapping part 34 carries out a mapping with respect to a combination of the repetition code sequence generated by the repetition encoder 32 and the tree code sequence generated by the tree encoder 33, based on the set partitioning while maintaining correspondence between the mapping and the transmission unit. The modulator 35 generates a transmitting wave signal by carrying out an M-ary modulation scheme with respect to a carrier wave signal based on the combination which is mapped by the mapping part 34, and transmits the transmitting wave signal to a radio channel.

With respect to a number N of transmission symbols indicated by a single branch of a trellis diagram indicating the sequence of the tree code sequence, the number of the dummy bits for the first bit sequence is $\{\max(A,[BN/rk])-A\}$ and the number of the dummy bits for the second bit sequence is $\{\max(A,[BN/rk])-BN/rk\}\cdot rk/N$. In addition, the predetermined number is rk/N, and the modulator 35 modulates the carrier wave signal by $2^{(1+n/N)}$ levels.

According to this transmitter shown in FIG. 7, the word length of the transmission unit is corrected to a value adapted to each desired coding level, and the coded modulation is applied with the combination of the repetition coding and the tree coding. For this reason, the transmission information having various formats can be transmitted by carrying out the coded modulation, and at the receiving end, it is possible to reduce the bit error and to efficiently carry out the maximum likelihood decoding based on a simple processing procedure.

Next, a description will be given of the operating principle of a receiver according to the second aspect of the present invention, by referring to FIG. 8.

Figure 8:
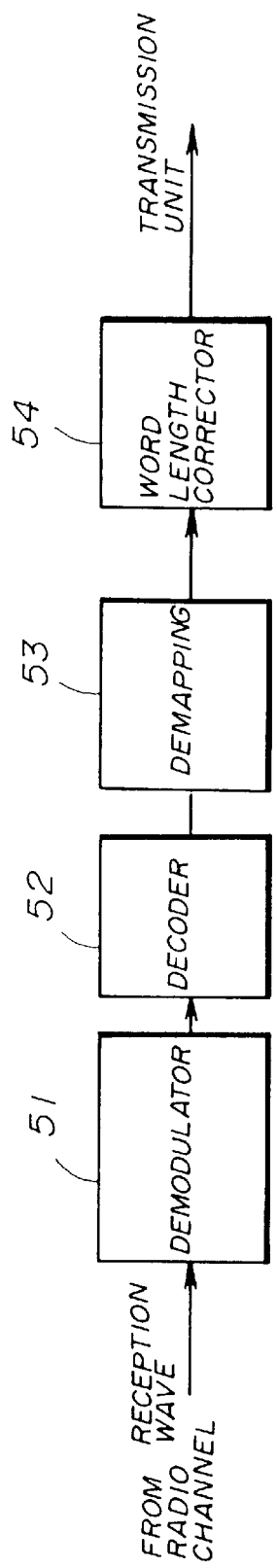
FIG. 8 is a system block diagram for explaining the operating principle of a receiver according to the second aspect of the present invention.

A receiver includes a demodulator 51, a decoder 52, a demapping part 53 and a word length corrector 54 which are connected as shown in FIG. 8. The demodulator 51 obtains a reception sequence by demodulating a reception wave received from the transmitter shown in FIG. 7 via the radio channel. The decoder 52 generates a decoded symbol sequence by carrying out a maximum likelihood decoding with respect to the reception sequence obtained by the demodulator 51. The demapping part 53 reads the decoded symbol sequence generated by the decoder 52, and restores the first bit sequence and the second bit sequence which are generated by the divider 31 of the transmitter shown in FIG. 7 by carrying out a demapping adapted to the format of the set partitioning carried out by the mapping part 34 of the transmitter shown in FIG. 7. The word length corrector 54 reads the first bit sequence and the second bit sequence which are obtained by the demapping part 53, and restores the transmission unit by eliminating the dummy bits which are added to the first bit sequence and the second bit sequence by the divider 31 of the transmitter shown in FIG. 7.

According to this receiver shown in FIG. 8, it is possible to positively restore the transmission information (transmission unit) indicated by the reception wave which is received from the transmitter via the radio channel.

Next, a description will be given of a first embodiment of the transmitter and the receiver according to the present invention. This first embodiment employs the first aspect of the present invention described above.

Figure 9:
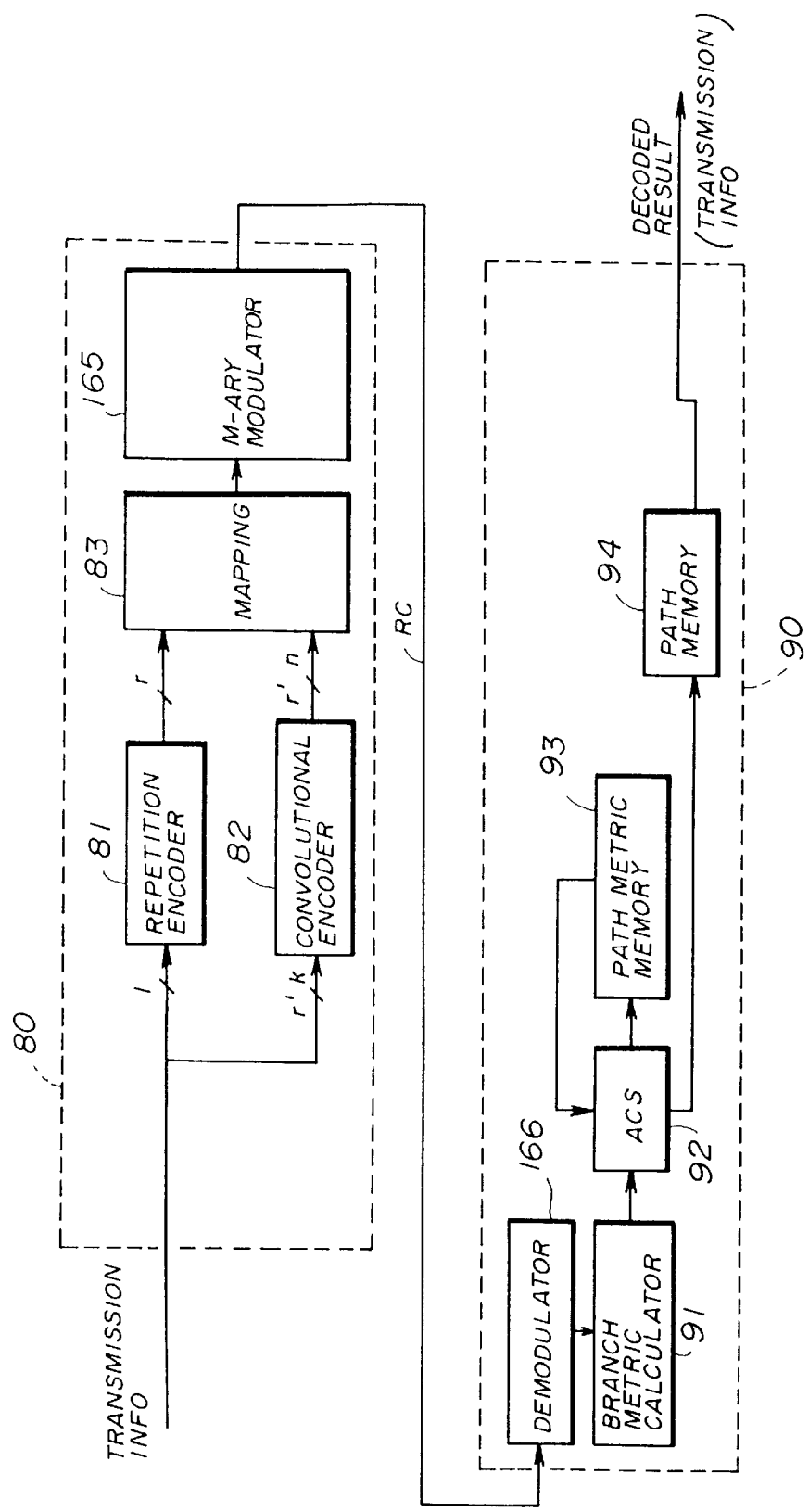
FIG. 9 is a system block diagram showing a first embodiment of a transmitter and a receiver according to the present invention.

FIG. 9 is a system block diagram showing this first embodiment of the transmitter and the receiver according to the present invention. In FIG. 9, a transmitter 80 and a receiver 90 are located at opposite ends via a radio channel RC.

The transmitter 80 includes a repetition encoder 81, a convolutional encoder 82, a mapping circuit 83, and an M-ary modulator 165 which are connected as shown in FIG. 9. The repetition encoder 81 corresponds to the repetition encoder 11 shown in FIG. 5, and the convolutional encoder 82 corresponds to the tree encoder 12 shown in FIG. 5. The mapping circuit 83 corresponds to the mapping part 13 shown in FIG. 5, and the M-ary modulator 165 corresponds to the modulator 14 shown in FIG. 5.

On the other hand, the receiver 90 includes a branch metric calculator 91, an add-compare-select (ACS) part 92, a path metric memory 93, a path memory 94, and a demodulator 166 which are connected as shown in FIG. 9. The branch metric calculator 91, the ACS part 92, the path metric memory 93 and the path memory 94 correspond to the decoder 42 and the demapping part 43 shown in FIG. 6. The demodulator 166 corresponds to the demodulator 41 shown in FIG. 6.

At the transmitter 80, out of the transmission information that is divided into units of 25-bit words each made up of a bit $a_1$ and bits $b_1$ through $b_{24}$, the bit $a_1$ is input to the repetition encoder 81 while the bits $b_1$ through $b_{24}$ are input to the convolutional encoder 82. Outputs of the repetition encoder 81 and the convolutional encoder 82 are connected to corresponding inputs of the mapping circuit 83. An output of this mapping circuit 83 is connected to an input of the M-ary modulator 165. An output of the M-ary modulator 165 connects to the radio channel.

In addition, at the receiver 90, the demodulator 166 demodulates a transmitting information received via the radio channel, and inputs a reception sequence to the branch metric calculator 91. An output of this branch metric calculator 91 is connected to one input of the ACS part 92. One output of the ACS part 92 is coupled to the other input of the ACS part 92 via the path metric memory 93. The other output of the ACS part 92 is connected to an input of the path memory 94, and a decoded result is obtained from an output of this path memory 94.

In the transmitter 80, the repetition encoder 81 carries out a repetition coding process with respect to the bit $a_1$ at a rate 1/r, where r is a predetermined integer, and successively generates r-bit code words (hereinafter referred to as repetition code words).

In addition, the convolutional encoder 82 successively carries out a convolutional coding process which is based on a constraint length K and a rate R (=k/n) with respect to a code block length n, with respect to bits $b_i$ through $b_{i+r'k-1}$, where i=1, 2, .... The bits $b_i$ through $b_{i+r'k-1}$ have a bit length r'k with respect to a real number r' and an information block length k which are given by a formula r'=r/N with respect to the predetermined integer r and a number N of symbols to be indicated by a single branch of a trellis diagram. Hence, code words $c_l$ through $c_{l+r'n-1}$ (hereinafter referred to as convolutional code words) having a word length r'n are generated by the convolutional encoder 82, where l=1, r'n, ....

The mapping circuit 83 generates data amounting to r symbols which can be transmitted according to an M-ary modulation scheme having $2^M$ signal points with respect to a number M satisfying a formula r+r'n=Mr, by dividing the repetition code words and the convolutional code words into a most significant bit (MSB) and subsequent lower significant bits based on the set partitioning. Furthermore, during this process of generating the data, the mapping circuit 83 sets a least square Euclidean distance $d^2_{Emin}(l_i)$ to satisfy a formula $d^2_{Emin}(l_i)=\Delta_i \cdot d_{min}(i)$ with respect to a distance $\Delta_i$ between the signal points and a coding level (minimum distance of codes) $d_{min}(i)$.

The M-ary modulator 165 generates a transmitting wave signal by subjecting a carrier wave signal to a 8-phase phase shift keying (PSK) modulation scheme depending on the values of the symbols generated by the mapping circuit 83. Under such a modulation, the distances between the signal points respectively become $\Delta_1=0.58$ and $\Delta_2=2$, the value of the least square Euclidean distance $d^2_{Emin}$ becomes "8", and the values of the coding levels $d_{min}(1)$ and $d_{min}(2)$ respectively become "14" and "4".

The above described conditions stand when the repetition coding is carried out at a rate of "1/14", and the convolutional coding is carried out at a rate of "3/4" and a constraint length of "4", for example.

Furthermore, when the repetition coding and the convolutional coding are carried out in this manner, a band efficiency (r'k+1)/r becomes approximately 1.57 bits/symbol which is approximately 20% smaller than a band efficiency (=2 bits/symbol) in the case of the trellis coding and the block coding. However, since the value of the least square Euclidean distance $d^2_{Emin}$ becomes "8" which is double the value of the conventional trellis coding and block coding, this embodiment can further obtain a coding gain of approximately 1.5 dB.

This embodiment does not use a non-coded bit level and carries out a maximum likelihood decoding. For this reason, it is possible to reduce the degradation of the performance particularly over a fading channel, and the performance is further improved as compared to that of the conventional system.

On the other hand, in the receiver 90, information indicating the trellis diagram of the code sequence given by the transmitting wave signal is supplied in advance to the branch metric calculator 91. Hence, with respect to the reception sequence obtained from the demodulator 166, the branch metric calculator 91 calculates the branch metric of all branches $b_{ij}$ from each state $S_i$ at a time t to a state $S_j$ at a time t+1.

With respect to all such branches $b_{ij}$, the ACS part 92 updates the path metric by carrying out a arithmetic operation indicated by a formula $\sigma_{i,t+1}=\sigma_{i,t}+\lambda(y_t, b_{ij})$ by carrying out the following operations (1) through (3), where $\sigma$ denotes the path metric, $\lambda$ denotes the branch metric, and $y_t$ denotes the received block sequence at a time t.

(1) With respect to the branches $b_{ij}$, add the path metrics $\sigma_{i,t}$ of survivor paths $p_{i,t}$ of each state $S_i$ at a time t to the branch metric $\lambda(y_t, b_{ij})$;

(2) For every state $S_j$ at the time t+1, compare the sums obtained in (1) above with respect to all paths up to the state $S_j$, and select a combination of the survivor path $p_{i,t}$ and the branch $b_{ij}$ that results in a minimum value; and (3) Obtain the path linking the survivor path $p_{i,t}$ and the branch $b_{ij}$ selected in (2) above as a survivor path $p_{i,t+1}$ of the state $S_j$ and update the path metric followed by the above mentioned formula. During the process of carrying out this arithmetic operation, the path memory 94 stores the survivor path of each state, and the path metric memory 93 stores the metric which is updated as described above and supplies a subject of a similar operation to be carried out by the ACS part 92 depending on the following reception sequence.

Figure 10:
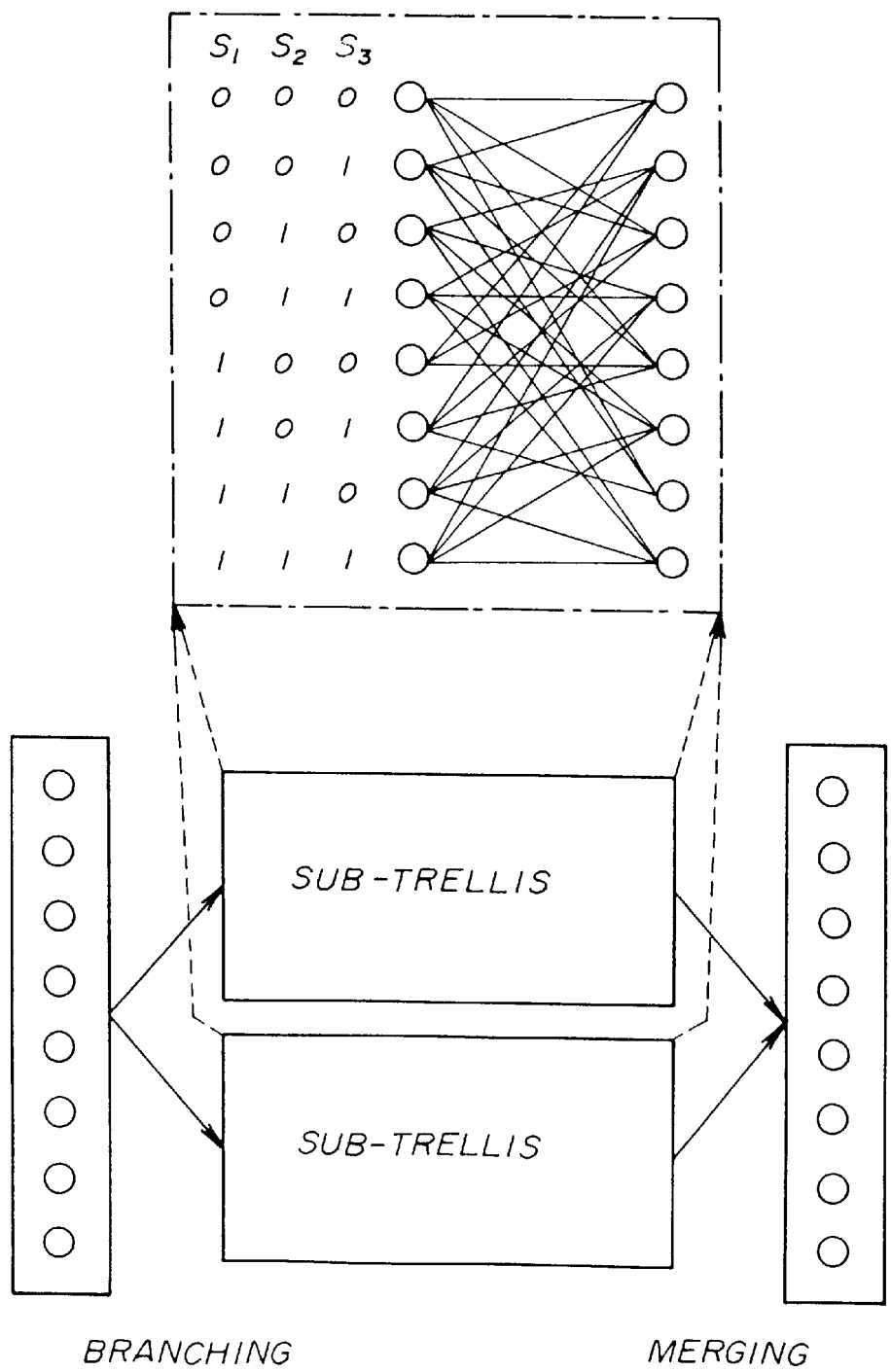
FIG. 10 is a diagram showing a trellis diagram of a code sequence generated by the embodiment.

In other words, a decoded result corresponding to the column of the selected branch is obtained from the output from the path memory 94. In addition, the trellis diagram which is used as a reference for the operation carried out by the branch metric calculator 91 and the ACS part 92 is given as a combination of 2 identical sub-trellis diagrams independently corresponding to the logic values of the repetition code, as shown in FIG. 10.

Figure 11:
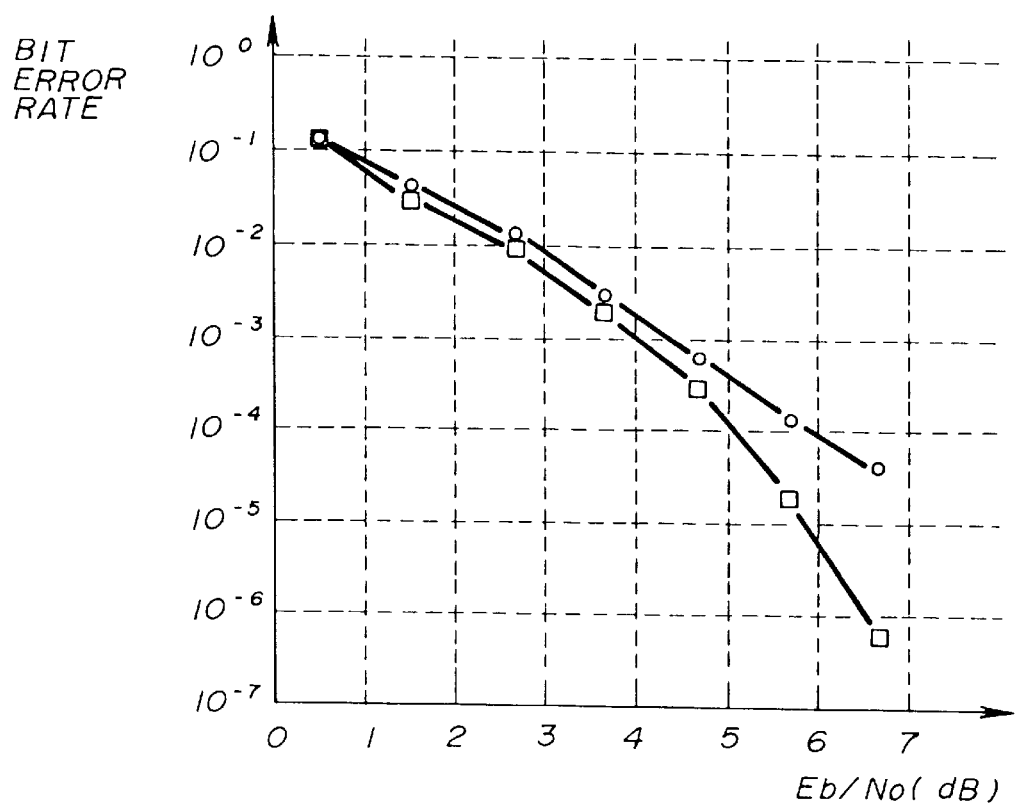
FIG. 11 is a diagram showing a BER obtained by the embodiment.

Therefore, according to this first embodiment, the coded modulation is positively realized by a simple structure utilizing the combination of the repetition coding and the convolutional coding. In addition, at the receiving end, the maximum likelihood decoding (Viterbi decoding) is positively applied when carrying out the decoding process. Hence, as indicated by circular marks and square marks in FIG. 11, it is possible to form 2 transmission channels having different BERs.

Next, a description will be given of a second embodiment of the transmitter and the receiver according to the present invention. This second embodiment employs the first aspect of the present invention described above.

Figure 12:
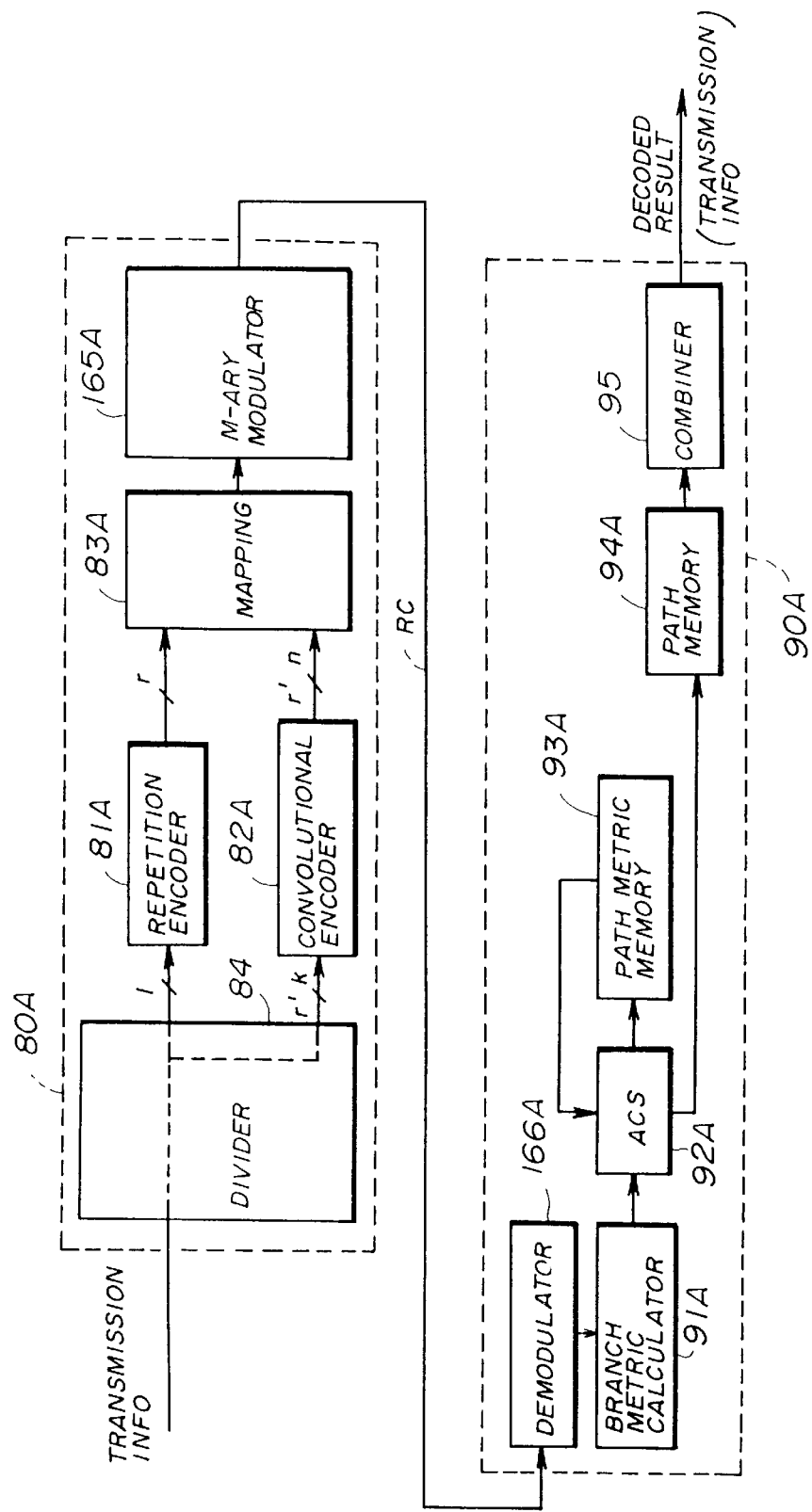
FIG. 12 is a system block diagram showing a second embodiment of the transmitter and the receiver according to the present invention.

FIG. 12 is a system block diagram showing this second embodiment of the transmitter and the receiver according to the present invention. In FIG. 12, a transmitter 80A and a receiver 90A are located at opposite ends via a radio channel RC. In FIG. 12, those parts which are essentially the same as those corresponding parts in FIG. 9 are designated by the same reference numeral with an affix "A", and a description thereof will be omitted.

The transmitter 80A includes a divider 84, a repetition encoder 81A, a convolutional encoder 82A, a mapping circuit 83A, and an M-ary modulator 165A which are connected as shown in FIG. 12. The divider 84 corresponds to the divider 21 shown in FIG. 5. The repetition encoder 81A corresponds to the repetition encoder 11 shown in FIG. 5, and the convolutional encoder 82A corresponds to the tree encoder 12 shown in FIG. 5. The mapping circuit 83A corresponds to the mapping part 13 shown in FIG. 5, and the M-ary modulator 165A corresponds to the modulator 14 shown in FIG. 5.

On the other hand, the receiver 90A includes a branch metric calculator 91A, an ACS part 92A, a path metric memory 93A, a path memory 94A, a demodulator 166A, and a combiner 95 which are connected as shown in FIG. 12. The branch metric calculator 91A, the ACS part 92A, the path metric memory 93A, the path memory 94A and the combiner 95 correspond to the decoder 42 and the demapping part 43 shown in FIG. 6. The demodulator 166A corresponds to the demodulator 41 shown in FIG. 6.

In the transmitter 80A, the divider 84 successively reads the transmission information in synchronism with the transmission information. Further, based on the format of the transmission information, such as the frame structure of the transmission information, and a combination of upper limit values of the BER to be secured under this format, the divider 84 divides bits included in the individual transmission information into 2 groups, and supplies one group to the repetition encoder 81A and the other group to the convolutional encoder 82A. For the sake of convenience, it is assumed that one group consists solely of a bit $a_1$ which is supplied to the repetition encoder 81A, and the other group consists of bits $b_1$ through $b_{24}$ which are supplied to the convolutional encoder 82A. The operations of the repetition encoder 81A, the convolutional encoder 82A, the mapping circuit 83A and the M-ary modulator 165A are basically the same as those of the first embodiment described above.

On the other hand, in the receiver 90A, the The operations of the demodulator 166A, the branch metric calculator 91A, the ACS part 92A, the path metric memory 93A and the path memory 94A are basically the same as those of the first embodiment described above.

Therefore, according to this second embodiment, the coded modulation is positively realized by a simple structure utilizing the combination of the repetition coding and the convolutional coding. In addition, at the receiving end, the maximum likelihood decoding (Viterbi decoding) is positively applied when carrying out the decoding process. Hence, it is possible to form 2 transmission channels having different BERs. These features can be obtained by adapting to the format of the transmission information and/or the combination of the upper limit values of the BER to be secured under the format, under cooperation of the divider 84 and the combiner 95, thereby increasing the coding gain while flexibly adapting to the format of the transmission information.

Next, a description will be given of a third embodiment of the transmitter and the receiver according to the present invention. This third embodiment employs the second aspect of the present invention described above.

Figure 13:
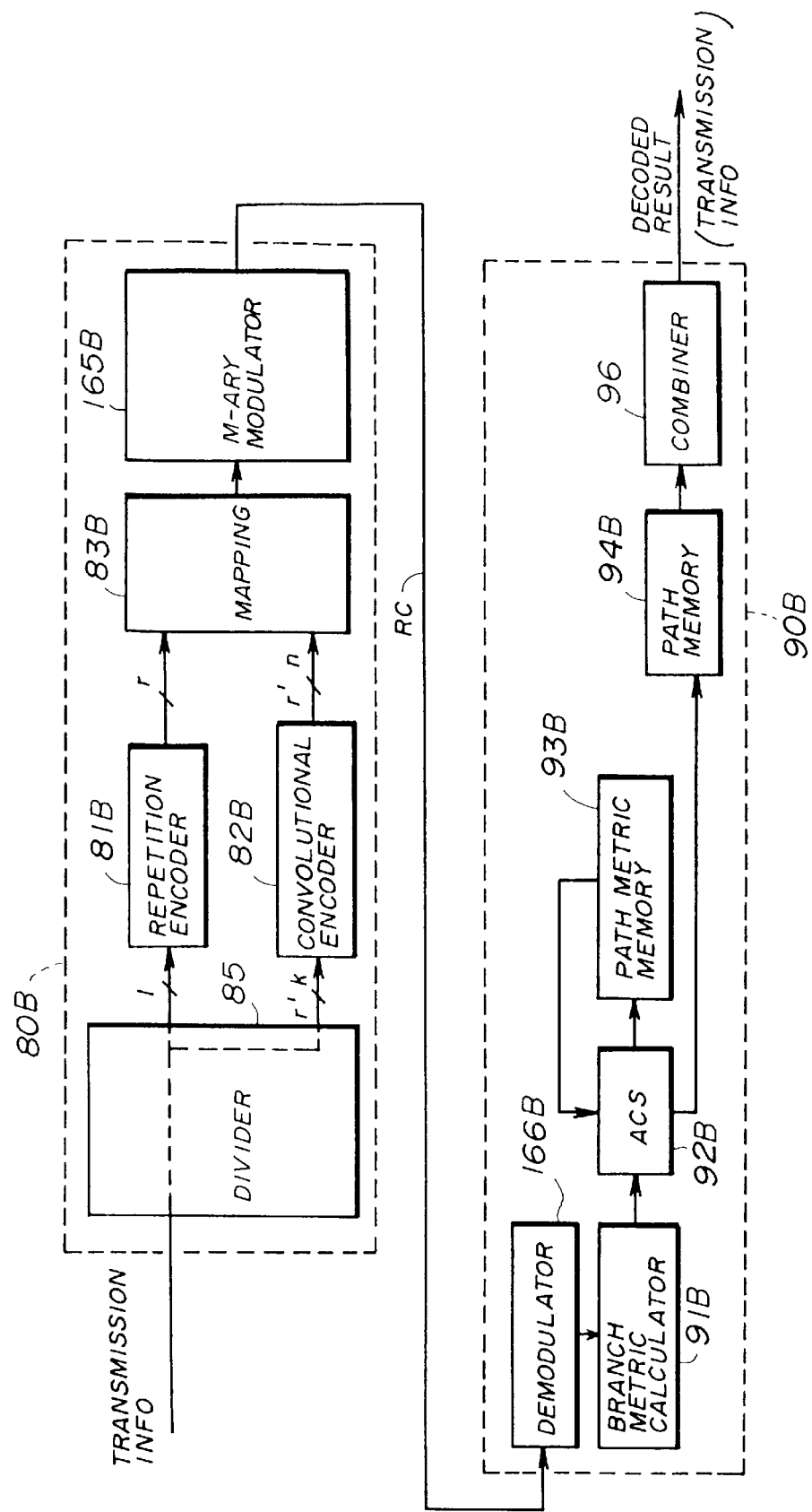
FIG. 13 is a system block diagram showing a third embodiment of the transmitter and the receiver according to the present invention.

FIG. 13 is a system block diagram showing this third embodiment of the transmitter and the receiver according to the present invention. In FIG. 13, a transmitter 80B and a receiver 90B are located at opposite ends via a radio channel RC. In FIG. 13, those parts which are essentially the same as those corresponding parts in FIG. 9 are designated by the same reference numeral with an affix "B", and a description thereof will be omitted.

The transmitter 80B includes a divider 85, a repetition encoder 81B, a convolutional encoder 82B, a mapping circuit 83B, and an M-ary modulator 165B which are connected as shown in FIG. 13. The divider 85 corresponds to the divider 31 shown in FIG. 7. The repetition encoder 81B corresponds to the repetition encoder 31 shown in FIG. 7, and the convolutional encoder 82B corresponds to the tree encoder 32 shown in FIG. 7. The mapping circuit 83B corresponds to the mapping part 33 shown in FIG. 7, and the M-ary modulator 165B corresponds to the modulator 34 shown in FIG. 7.

On the other hand, the receiver 90B includes a branch metric calculator 91B, an ACS part 92B, a path metric memory 93B, a path memory 94B, a demodulator 166B, and a combiner 96 which are connected as shown in FIG. 13. The branch metric calculator 91B, the ACS part 92B, the path metric memory 93B, the path memory 94B and the combiner 96 correspond to the decoder 52, the demapping part 53 and the word length corrector 54 shown in FIG. 8. The demodulator 166B corresponds to the demodulator 51 shown in FIG. 8.

In the transmitter 80B, the transmission information is input to the divider 85 in units of frames (or cells), where each frame is made up of 2 fields having different tolerable upper limit values of BER. The divider 85 successively reads the frames of the transmission information in synchronism with the frames, and carries out a process with respect to each of the frames based on the following procedure.

[1] Divide contents of the 2 fields, and store the divided contents as matrixes $\alpha$ and $\beta$;

[2] Respectively input the matrixes $\alpha$ and $\beta$ to the repetition encoder 81B and the convolutional encoder 82B as subjects to be encoded; and

[3] For each field obtained by the dividing described in [1] above, successively write (M−A) dummy bits to the end of the matrix α and successively write ((M−B/r'k)·r'k) dummy bits to the end of the matrix β, with respect to an integer M described by a formula M=max(A,[B/r'k]) under a Gaussian symbol "[ ]" depending on a number A of bits to be subjected to the repetition coding in the repetition encoder 81B, a number B of bits to be subjected to the convolutional coding in the convolutional encoder 82B, a real number r', and an information block length k. The end of the matrix α refers to a region adjacent to a region which stores the end bit of the matrix α forming the transmission information. Similarly, the end of the matrix β refers to a region adjacent to a region which stores the end bit of the matrix β forming the transmission information.

For the sake of convenience, it is assumed that the logic values of the above dummy bits are all "0".

In addition, when the contents of the matrixes α and β become definite under the above described process, the divider 85 refers to these matrixes α and β in an ascending order and reads 1 bit at a time from the matrix α and reads r'k bits at a time from the matrix β. The bits read from the matrix α are successively input to the repetition encoder 81B, and the bits read from the matrix β are successively input to the convolutional encoder 82B.

The operations of the repetition encoder 81B, the convolutional encoder 82B, the mapping circuit 83B and the M-ary modulator 165B are basically the same as those of the first embodiment described above.

On the other hand, in the receiver 90B, the combiner 96 successively reads the decoded results obtained via the path memory 94B (procedures [1] through [3]), and restores the transmission information by carrying out a process complementary to the series of processes carried out by the divider 85 described above. The operations of the demodulator 166B, the branch metric calculator 91B, the ACS part 92B, the path metric memory 93B and the path memory 94B are basically the same as those of the first embodiment described above.

Therefore, according to this third embodiment, the coded modulation is positively realized by a simple structure utilizing the combination of the repetition coding and the convolutional coding. In addition, at the receiving end, the maximum likelihood decoding (Viterbi decoding) is positively applied when carrying out the decoding process. Hence, it is possible to form 2 transmission channels having different BERs. These features can be obtained by flexibly adapting to the arrangement and/or size of the fields included in the frames forming the transmission information, under cooperation of the divider 85 and the combiner 96, thereby increasing the band efficiency and the coding gain while flexibly adapting to the format of the transmission information.

In each of the embodiments described above, the convolutional coding is carried out in parallel to the repetition coding, however, the coding carried out in parallel to the repetition coding is of course not limited to the convolutional coding.

In addition, with respect to the convolutional coding and the tree coding, a block coding may be used as a substitute coding scheme if a soft decision is made under a sufficient linear reception at the receiving end.

Furthermore, although the PSK modulation is used in each of the embodiments described above, the present invention is of course not limited to the use of the PSK modulation. For example, if a coded modulation based on a desired signal arrangement is possible, it is possible to use frequency shift keying (FSK) modulation, amplitude shift keying (ASK) modulation or quadrature-amplitude modulation (QAM) scheme in the present invention.

Moreover, although the arrangements of signal points are not shown for the embodiments described above, such signal arrangements can be mapped based on the set partitioning. In addition, the signal arrangements are not limited to a particular arrangement as long as the degradation of the transmission efficiency caused by the increase of the peak power of the transmitting wave can be suppressed to a tolerable range.

Further, the present invention is not limited to these embodiments, but various variations and modifications may be made without departing from the scope of the present invention.

What is claimed is:

1. A transmitter comprising:
    a repetition encoder generating a repetition code sequence having a word length of r bits by carrying out a repetition coding with respect to 1 bit of a transmission unit which divides transmission information by a predetermined word length, where a rate of the repetition coding is set equal to a reciprocal of a predetermined integer r;
    a tree encoder generating a tree code sequence by carrying out a tree coding with respect to the other bits of the transmission unit, where a rate of the tree coding is set to k/n, k denotes an information block length and n denotes a code block length;
    a mapping part carrying out a mapping with respect to a combination of the repetition code sequence generated by said repetition encoder and the tree code sequence generated by said tree encoder, based on a set partitioning while maintaining correspondence between the mapping and the transmission unit; and
    a modulator generating a transmitting wave signal by carrying out an M-ary modulation sceheme with respect to a carrier wave signal based on the combination which is mapped by said mapping part, and transmitting the transmitting wave signal to a radio channel,
    said predetermined word length being (1+rk/N) bits, where N denotes a number of transmission symbols indicated by a single branch of a trellis diagram indicating a sequence of the tree code sequence,
    said modulator modulating the carrier wave signal by $2^{(1+n/N)}$ levels.

2. The transmitter as claimed in claim 1, wherein the transmission unit is given by a format which is made up of a combination of 1 bit corresponding to an order of tolerable upper limit values of a bit error rate and the other bits, said transmitter further comprising:
    a divider dividing the transmission unit into the 1 bit and the other bits based on the format, and supplying the 1 bit to said repetition encoder the other bits to said tree encoder.

3. The transmitter as claimed in claim 1, wherein said modulator carries out an M-ary modulation sceheme selected from a group consisting of phase shift keying modulation, frequency shift keying modulation, amplitude shift keying modulation and quadrature-amplitude modulation.

4. The transmitter as claimed in claim 1, wherein said tree encoder carries out a block coding.

5. A transmitter comprising:
    a divider reading transmission units which are given by a format in which transmission information is divided by a word having a bit length A+B which is equal to a sum of A bits corresponding to an order of tolerable upper limit values of a bit error rate and B bits, and generating a first bit sequence and a second bit sequence by isolating the A bits and the B bits from the transmission unit based on the format and adding first dummy bits and second dummy bits to the A bits and the B bits, respectively;

a repetition encoder generating a repetition code sequence by extracting 1 bit at a time from the first bit sequence generated by said divider and carrying out a repetition coding at a rate equal to a reciprocal of a predetermined integer r;

a tree encoder generating a tree code sequence by extracting a predetermined number of bits at a time from the second bit sequence generated by said divider and carrying out a tree coding at a rate k/n, where k denotes an information block length and n denotes a code block length;

a mapping part carrying out a mapping with respect to a combination of the repetition code sequence generated by said repetition encoder and the tree code sequence generated by said tree encoder, based on a set partitioning while maintaining correspondence between the mapping and the transmission unit; and a modulator generating a transmitting wave signal by carrying out an M-ary modulation scheme with respect to a carrier wave signal based on the combination which is mapped by said mapping part, and transmitting the transmitting wave signal to a radio channel, with respect to a number N of transmission symbols indicated by a single branch of a trellis diagram indicating a sequence of the tree code sequence, a number of the first dummy bits being $\{max(A,[BN/rk])-A\}$ and a number of the second dummy bits being $\{max(A, [BN/rk])-BN/rk\}\cdot rk/N$, said predetermined number being rk/N, said modulator modulating the carrier wave signal by $2^{(1+n/N)}$ levels.

6. The transmitter as claimed in claim 5, wherein said modulator carries out an M-ary modulation scheme selected from a group consisting of phase shift keying modulation, frequency shift keying modulation, amplitude shift keying modulation and quadrature-amplitude modulation.

7. The transmitter as claimed in claim 5, wherein said tree encoder carries out a block coding.

* * * * *